United States Patent [19]

Oetiker

[11] Patent Number: 4,622,720
[45] Date of Patent: Nov. 18, 1986

[54] FASTENING ARRANGEMENT FOR OPEN HOSE CLAMP

[76] Inventor: Hans Oetiker, 21 Oberdorfstrasse, CH-8810 Horgen, Switzerland

[21] Appl. No.: 622,766

[22] Filed: Jun. 20, 1984

Related U.S. Application Data

[63] Continuation-in-part of Ser. No. 446,503, Dec. 3, 1982.

[51] Int. Cl.$^4$ .............................................. B65D 63/02
[52] U.S. Cl. ............................... 24/20 TT; 24/20 EE; 24/20 CW; 24/23 EE
[58] Field of Search .................. 24/20 R, 20 S, 20 W, 24/20 TT, 20 EE, 20 CW, 19, 272, 279, 16 R, 16 PB

[56] References Cited

U.S. PATENT DOCUMENTS

| | | | |
|---|---|---|---|
| Re. 14,762 | 11/1919 | Springer | 24/23 EE |
| Re. 26,157 | 2/1967 | Tinnerman | 24/20 EE |
| 1,141,046 | 5/1915 | Dubus | 24/16 R |
| 1,277,076 | 8/1918 | Ireland | 24/20 CW |
| 2,970,359 | 2/1961 | Dryden | 24/16 PB |
| 3,321,811 | 5/1967 | Thomas | 24/20 CW |
| 4,299,012 | 11/1981 | Oetiker | 24/20 LS |
| 4,315,348 | 2/1982 | Oetiker | 24/20 W |
| 4,468,840 | 9/1984 | Sauer et al. | 24/20 R |
| 4,492,004 | 1/1985 | Oetiker | 24/20 R |

FOREIGN PATENT DOCUMENTS

| | | | |
|---|---|---|---|
| 1069204 | 7/1954 | France | 24/16 PB |
| 1080617 | 12/1954 | France | 24/16 PB |

Primary Examiner—Victor N. Sakran
Attorney, Agent, or Firm—Craig & Burns

[57] ABSTRACT

A clamp structure with a clamping band having open ends and a mechanical interconnection of the open ends of the band that include at least two outwardly extending hooks in the inner band portion adapted to engage in apertures in the outer band portion; at least one of the hooks is a cold-deformed support hook and another one of the hooks is a generally circumferentially extending combined guide and support hook which has an inclined guide and support surface operable to initially engage with the corresponding aperture in the outer band portion so as to guide the inner and outer band portions toward one another while at the same time absorbing circumferentially directed tightening forces until the cold-deformed support hook becomes effective in also absorbing tightening forces by engagement of its abutment surface with the corresponding aperture.

14 Claims, 6 Drawing Figures

FASTENING ARRANGEMENT FOR OPEN HOSE CLAMP

This application is a continuation-in-part application of my prior application Ser. No. 446,503 entitled "Earless Clamp Structure" and filed in the U.S. Patent and Trademark Office on Dec. 3, 1982.

The present invention relates to a fastening arrangement for open clamp structures.

BACKGROUND OF THE INVENTION

As pointed out in the aforementioned copending application, so-called open clamp structures are known in the prior art which can be installed radially about the object to be fastened. Prior to tightening such open clamp structures, the open ends thereof are interconnected by a mechanical connection. The tightening of the clamp structure may take place by various means, such as, so-called screw-type tightening devices, so-called "Oetiker" ears or by a special construction as disclosed in the aforementioned copending application.

Two principal sources for leakage exist with such types of open clamp structures. On the one hand, leakages may occur because of discontinuities in the form of steps or the like along the inner circumference of the band structure. These problems have been solved effectively by a so-called "stepless" clamp structure as disclosed in my prior U.S. Pat. No. 4,315,348. The other possible source of leakage is the inadequacy of the tightening force with which the clamp structure is closed. In particular, with the availability of plastic materials having a relatively high degree of hardness such as "HYTREL", which are used in the automotive industry in connection with axle boots, there exists a need for ever increasing tightening forces. The mechanical interconnection disclosed in my prior U.S. Pat. No. 4,299,012 provided an effective solution to the problem of the holding ability of the mechanical interconnection by the use of outwardly extending cold-deformed hooks which take over the force absorption function after a tab-like, transversely extending guide hook guided the inner and outer band portions toward one another during the tightening of the clamp structure. While the mechanical interconnection disclosed in my prior U.S. Pat. No. 4,299,012 proved quite satisfactory, it nevertheless entailed certain disadvantages. The open clamp structures as disclosed for example in FIG. 7 of my prior U.S. Pat. No. 4,299,012 are normally stamped out from flat band material and for reasons of economy are shipped as flat blanks from the place of manufacture to the location of use thereof, for example, an assembly line in an automotive plant where they are preformed into substantially circular shape prior to assembly over the object to be fastened, as disclosed, for example, in my prior U.S. Pat. No. 4,425,781. Since the hooks are normally formed with the use of the same die in the automatic machines manufacturing the flat blank, the angle of the guide hook, which thus has a predetermined angle in the flat blank, will vary in the installed condition, depending on the radius of curvature of the clamping band, i.e., on the diameter thereof. This in turn requires special subsequent attention and remedial action to maintain optimum conditions for the angle of the guide hook in the assembled condition of the clamp. Additionally, the guide hook, which is not intended to absorb any significant tightening forces, is formed by a substantially rectangular tab-like member punched out of the band material, thereby leaving an aperture in the band material corresponding to the area of the punched-out guide hook. This, in turn, may lead to a tendency of the band material to buckle or kink within the area where the band material has been reduced by the punched-out guide hook, when the flat blank is bent into the approximately circular shape of the clamp.

OBJECT OF THE INVENTION

Accordingly, it is a principle of the present invention to provide a mechanical interconnection for an open clamp structure which avoids the aforementioned shortcomings and drawbacks encountered with the prior art interconnections and which will permit the use of even higher tightening forces for the clamp structure without danger of damage to the mechanical interconnection.

The underlying problems are solved according to the present invention in that the mechanical interconnection includes at least two hooks, one of which is a cold-deformed support hook, while the other is a combined guide and support hook. In a preferred embodiment of the present invention, the combined guide and support hook is formed by a tab-like member pressed out of the inner band portion and extending in the longitudinal (circumferential) direction of the band, which is adapted to engage in a relatively narrow slot-like aperture provided in the outer band portion and also extending in the longitudinal (circumferential) direction of the band. The guide and force engaging surface of the combined guide and support hook is thereby formed by the inclined edge of the tab-like member facing away from the free end of the inner band portion. As a result thereof, the combined guide and support hook will initially guide the inner and outer band portions toward another while at the same time absorbing circumferentially directed tightening forces until such time as the cold-deformed hook or hooks become effective by engagement with the respective aperture or apertures thereof, at which time the combined guide and support hook will continue to perform a force-absorbing function assisting the cold-deformed support hooks to absorb the tightening forces.

The thus constructed tab-like combined guide and support hook is able to absorb substantial forces in the circumferential direction without the danger of bending during the tightening of the clamp. Moreover, the likelihood of kinking or buckling of the band material within the area of the combined guide and support hook is effectively precluded since the combined guide and support hook offers rigidity by its construction and thus effectively prevents any buckling or kinking. To further improve resistance to buckling and kinking, the combined guide and support hook is thereby so arranged that a larger amount of band material is left on one side thereof than on the other side that includes the opening left by the punched out combined guide and support hook. By thus locating the combined guide and support hook and its corresponding slot-like aperture substantially centrally in the inner and outer band portions, the holding ability of the mechanical interconnection is substantially increased since the combined guide and support hook substantially contributes to the holding ability of the mechanical interconnection in its installed condition.

These and other objects, features and advantages of the present invention will become more apparent from the following description when taken in connection with the accompanying drawing which shows, for purposes of illustration only, one embodiment in accordance with the present invention, and wherein.

Figure 1:
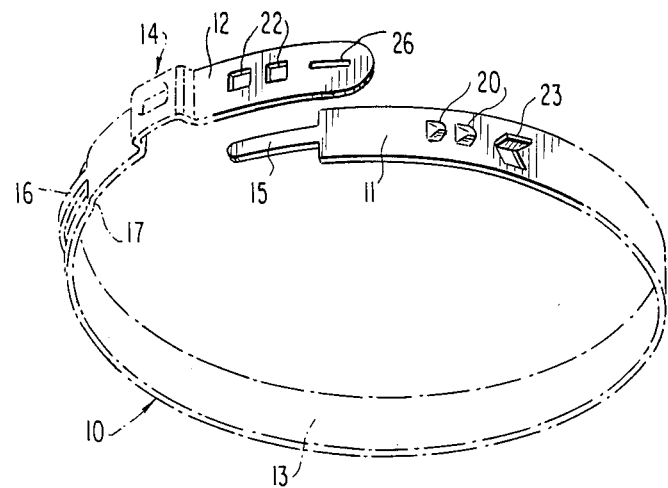
FIG. 1 is a perspective view of an open clamp structure with a mechanical interconnection in accordance with the present invention, showing the clamp structure in the preformed, non-assembled condition.
Figure 2:
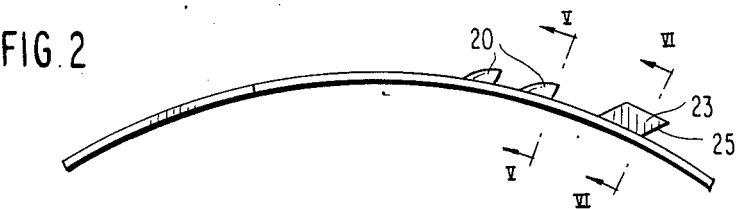
FIG. 2 is a partial side elevational view of the inner band portion of FIG. 1.
Figure 3:
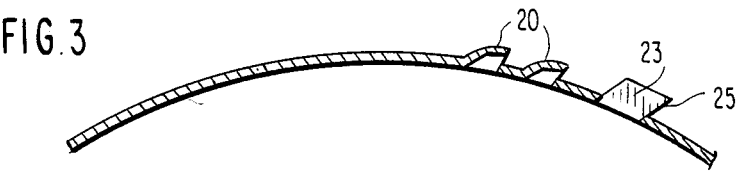
FIG. 3 is a longitudinal cross sectional view through the inner band portion of FIG. 1.

Referring now to the drawing wherein like reference numerals are used throughout the various views to designate like parts, and more particularly to FIG. 1, the open clamp structure generally designated by reference numeral 10 includes inner and outer overlapping band portions 11 and 12, respectively, which may be made from one-piece band material 13 or may be made of several parts interconnected by appropriate connections such as mechanical connections, as known to those skilled in the art. Once assembled over the object to be fastened, the clamp structure may be tightened by any known means, such as, for instance, by contraction of an ear generally designated by reference numeral 14, which may be a so-called "Oetiker" ear consisting of two leg portions interconnected by a bridging portion provided with reinforcing means, or by the structure shown in FIGS. 11 and 12 of my aforementioned patent application which obviates the need for an ear.

The clamp structure is preferably of the so-called stepless type of construction and includes a tongue portion 15 at the free end of the inner band portion 11 adapted to engage in a recess formed by a pressed-out portion 16 and a step 17, as more fully disclosed in my prior U.S. Pat. No. 4,315,348.

Figure 4:
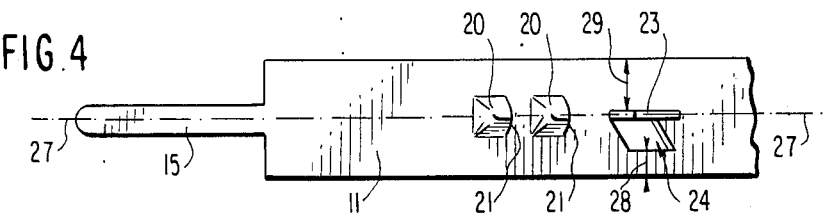
FIG. 4 is a top plan view of the inner band portion of the clamp structure illustrated in FIG. 1, showing the parts in the flattened-out condition.
Figure 5:
FIG. 5 is a cross sectional view taken along line V—V of FIG. 2.
Figure 6:
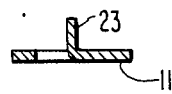
FIG. 6 is a cross sectional view taken along line VI—VI of FIG. 2.

The mechanical interconnection according to the present invention includes one or more cold-deformed hooks 20, in the illustrated embodiment, two such cold-deformed hooks 20 which have force-engaging abutment surfaces 21 and are constructed as disclosed in my prior U.S. Pat. No. 4,299,012. As disclosed in this last-mentioned patent, each cold-deformed support hook 20 is integral with the adjoining parts of the band material on all sides thereof, except within the area of the generally transversely extending cut which results in the force-engaging abutment surface 21. The support hooks 20 are adapted to engage in rectangular apertures 22, as also disclosed in the last-mentioned prior patent. According to the present invention, in addition to the cold-deformed support hooks 20, a combined guide and support hook 23 is provided which is punched and pressed out of the inner band portion 11 and extends at substantially right angle to the outer surface thereof (FIG. 6). The outer band portion 12 is provided with a relatively narrow slot 26 for receiving the combined guide and support hook 23. To perform the guide function, the rear edge 25 of the combined guide and support hook 23, which faces away from the free end of the inner band portion 11, is inclined rearwardly outwardly so as to guide the inner and outer band portions 11 and 12 toward one another when the clamp structure is tightened about the object to be fastened. The tab-like combined guide and support hook 23 as well as the slot 26 are preferably located within the area of the longitudinal center axis 27 of the band (FIG. 4). This leaves unequal amounts of band material on the two sides of the combined guide and support hook 23 due to the fact that the area 28 is reduced by the existence of the opening 24 compared to the area 29 on the opposite side of the combined guide and support hook 23. The combined guide and support hook is, for example, in the shape of a parallelogram leaving an opening 24 of corresponding configuration. However, it is understood that the configuration and shape of the combined guide and support hook 23 may also be different from that shown in the drawing to match particular requirements, as known to those skilled in the art.

During assembly, the combined guide and support hook 23 is extended through the slot-like aperture 26 whereafter tightening of the clamp is commenced. As a result of the circumferentially directed tightening forces, the inclined guide and force-engaging surface 25 causes the inner and outer band portions 11 and 12 to move toward one another until, during continuing tightening, the cold-deformed support hooks 20 become effective to absorb tightening forces by engagement with their respective apertures 22. The combined guide and support hook 23, by reason of its particular configuration and construction, thus not only performs a guide function, but also a support function until its support function is assisted by the cold-deformed support hooks 20. However, even after the the cold-deformed support hooks 20 become effective, the combined guide and support hook 23 will continue to assist in the support function since it is able to absorb longitudinally directed forces without bending. Furthermore, the likelihood of buckling or kinking within the areas 28 and 29 is effectively precluded due to the resistance offered by the substantial amount of band material present in the area 29.

Additionally, the combined guide and support hook 23 offers the possibility to provide a permanent mechanical connection between the open ends of the clamp structure by a riveting action, for example, as disclosed in my U.S. Pat. No. 3,286,314.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A clamp structure, comprising clamping band means having open ends, and means mechanically interconnecting the open ends of the band means including at least two outwardly extending hook means in an inner band portion operable to engage in aperture means in an outer band portion, at least one of the hook means being a cold-deformed support hook, characterized in that another one of the hook means is a combined guide and support hook, said combined guide and support hook having inclined guide and support surface means operable to initially engage with the corresponding aperture means in the outer band portion, the rear edge of said guide and support surface means sloping upwardly away from the free end of the inner band portion, as viewed in side view of the clamp structure so as to guide the inner and outer band portions with respect to one another while at the same time absorbing circumferentially directed tightening forces until the cold-deformed support hook becomes effective in absorbing tightening forces by engagement of its abutment surface means with the corresponding aperture means while the combined guide and support hook will continue to assist in the support function as it is able to absorb longitudinally directed forces without bending.

2. A clamp structure according to claim 1, wherein said combined guide and support hook is an outwardly directed tab-like member pressed-out of the band material of the inner band portion and extending generally in the longitudinal direction of the band means.

3. A clamp structure according to claim 2, wherein said combined guide and support hook extends at least approximately perpendicularly to the surface of the inner band material with the rear edge thereof which faces away from the free end of the inner band portion, forming the guide and support surface means.

4. A clamp structure according to claim 3, wherein said guide and support hook is located substantially in the longitudinal center of the inner band portion.

5. A clamp structure according to claim 3, wherein the remaining band material of the inner band portion which is left on one side of the guide and support hook, as viewed in the transverse direction of the inner band portion, is wider than on the other side of the guide and support hook to thereby increase resistance to buckling.

6. A clamp structure according to claim 5, wherein the remaining band material of the inner band portion is reduced on the other side by the area of band material representing the area of the pressed-out guide and support hook.

7. A clamp structure according to claim 6, wherein said area is generally in the form of a parallelogram.

8. A clamp structure according to claim 7, wherein the aperture means in the outer band portion of each cold-deformed support hook is of generally rectangular configuration while the aperture means for the combined guide and support hook is a relatively narrow slot extending generally in the longitudinal direction of the band means.

9. A clamp structure according to claim 8, wherein said slot is located substantially in the longitudinal center of the outer band portion.

10. A clamp structure according to claim 1, wherein the remaining band material of the inner band portion which is left on one side of the guide and support hook, as viewed in the transverse direction of the inner band portion, is wider than on the other side of the guide and support hook to thereby increase resistance to buckling.

11. A clamp structure according to claim 10, wherein the remaining band material of the inner band portion is reduced on the other side by the area of band material representing the area of the pressed-out guide and support hook.

12. A clamp structure according to claim 11, wherein said area is generally in the form of a parallelogram.

13. A clamp structure according to claim 1, wherein the aperture means in the outer band portion for each cold-deformed support hook is of generally rectangular configuration while the aperture means for the combined guide and support hook is a relatively narrow slot extending generally in the longitudinal direction of the band means.

14. A clamp structure according to claim 13, wherein said slot is located substantially in the longitudinal center of the outer band portion.

* * * * *